United States Patent
Singh et al.

(10) Patent No.: US 8,155,634 B1
(45) Date of Patent: *Apr. 10, 2012

(54) SYSTEM AND METHOD FOR GENERATING AN ALERT SIGNAL WHEN AN ADDITIONAL DATA LINE BETWEEN A PACKET-SWITCHED NETWORK AND A WIRELESS COMMUNICATIONS NETWORK SHOULD BE INSTALLED

(75) Inventors: Anil Singh, Leawood, KS (US); Samuel Odedina, Chula Vista, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 809 days.

This patent is subject to a terminal disclaimer.

(21) Appl. No.: 12/202,766

(22) Filed: Sep. 2, 2008

(51) Int. Cl.
*H04M 3/00* (2006.01)

(52) U.S. Cl. ........ 455/418; 455/455; 455/423; 455/428; 455/456.5; 455/67.11; 370/332

(58) Field of Classification Search .................. 455/455, 455/423, 67.1, 428; 370/332, 328, 352–356
See application file for complete search history.

(56) References Cited

U.S. PATENT DOCUMENTS

| | | |
|---|---|---|
| 6,996,374 B1 | 2/2006 | Bao et al. |
| 7,302,265 B1 | 11/2007 | Chalishazar et al. |
| 2003/0086418 A1* | 5/2003 | McIntosh et al. ............. 370/356 |
| 2005/0041618 A1* | 2/2005 | Wei et al. ..................... 370/328 |
| 2007/0086474 A1 | 4/2007 | Lee et al. |
| 2008/0102772 A1 | 5/2008 | Gandhi |

* cited by examiner

*Primary Examiner* — Kamran Afshar
*Assistant Examiner* — Shahriar Behnamian (57) ABSTRACT

The present invention provides methods and systems to determine whether to upgrade the infrastructure of a wireless communication network. The invention is directed to generating an alert signal indicating that an additional data line between a packet-switched network and the wireless communications network should be installed. The alert signal may indicate that an additional data line should be installed. Alternatively, the alert signal may enter an automated order for the installation of an additional data line.

20 Claims, 5 Drawing Sheets

SYSTEM AND METHOD FOR GENERATING AN ALERT SIGNAL WHEN AN ADDITIONAL DATA LINE BETWEEN A PACKET-SWITCHED NETWORK AND A WIRELESS COMMUNICATIONS NETWORK SHOULD BE INSTALLED

RELATED APPLICATION

This application is related to the application filed on the same day as the instant application, entitled "System And Method For Generating An Alert Signal Indicating That An Additional Sector-Carrier Should Be Installed In A Wireless Coverage Area, Or That A Sector-Carrier In The Wireless Coverage Area Should Be Optimized." The disclosure of this related application is incorporated herein by reference.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet). The gateway is typically coupled with a packet-switched network using a data line such as a T1 cable or a fiber-optic cable.

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

To help manage call and data traffic in a wireless network, most cells are usually divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instant, an access terminal in a wireless network will typically be positioned in a given physical sector and will be able to communicate with the transport network via the BTS serving that physical sector.

Each sector may have allocated to it a distinct set of downlink channels that the BTS uses for transmitting signals to mobile stations and a distinct set of uplink channels that mobile stations may use for transmitting signals to the BTS. The uplink and downlink channels may use different carrier frequencies. Wireless telecommunications networks increasingly use multiple frequencies in some or all of their sectors in order to provide additional wireless capacity to those sectors. In particular, a sector may have allocated to it a plurality of uplink carrier frequencies, and a plurality of corresponding downlink carrier frequencies. As a result, the wireless coverage area is divided into a plurality of distinct "sector-carriers." Each sector-carrier is associated with a particular cell or sector, and with a particular set of one or more carrier frequencies. For example, a sector-carrier may have a set of uplink channels that use a particular uplink carrier frequency and a set of downlink channels that use a particular downlink carrier frequency.

Under some communications protocols, such as 1xEV-DO, data transmitted on the forward link (from the BTS to the mobile station) of each sector-carrier is defined in terms of frames. These frames are divided into a number of time slots, each slot being approximately 1.667 ms in length. In addition, service providers may monitor the number of slots being utilized (the slot-utilization rate) at a given time or over a period of time for each sector-carrier. If the slot-utilization is at or near 100%, the service provider may install an additional sector-carrier, or attempt to optimize the BTS.

The explosive growth in demand for wireless data services, along with the emergence of high-speed communication protocols, has caused the level of data traffic in most cell sites to increase dramatically over recent years. As such, cellular service providers typically monitor portions of the wireless communication network infrastructure to determine whether an upgrade to the infrastructure is necessary. For example, the service provider may monitor the traffic on the data lines between the packet switched network and the wireless communication system. If the traffic is near or at the data lines' maximum throughput, the service provider may install an additional data line.

However, even though the slot-utilization rate or the amount of traffic on the data lines may approach 100% at certain times, it does not necessarily mean that an infrastructure upgrade (which can cost hundreds of thousands, if not millions, of dollars) is necessary. For example, data traffic within the wireless communication network may increase due to significant news events or sporting events. It is also possible that an increase in data traffic is due to another phenomenon. As such, wireless service providers often will not upgrade the wireless network's infrastructure until customers regularly experience slow data communications due to the infrastructure being overwhelmed.

OVERVIEW

The present invention provides methods and systems to timely determine whether and when to upgrade the infrastructure of a wireless communication network. The first embodiment of the invention is directed to generating an alert signal indicating that an additional data line between the packet-switched network and the wireless communications network should be installed. In the first embodiment, sets of data are collected over a period of time. Each set of data comprises (i) a forward throughput of at least one data line used to transmit data between the packet switched network to the wireless communication network, (ii) a reverse throughput of the at least one data line, and (iii) a number of connections using the at least one data line. Each collected set of data is then analyzed to detect an aberration. Finally, an alert signal is generated based on the presence of a minimum number of aberrations over the period of time. The alert signal may indicate that an additional data line should be installed. Alternatively, the alert signal may enter an automated order for the installation of an additional data line.

The second embodiment is directed to generating an alert signal indicating that an additional sector-carrier should be installed in a wireless coverage area, or that a sector-carrier in the wireless coverage area should be optimized. In the second embodiment, sets of data are collected over a period of time. Each set of data (traffic data) comprises a slot-utilization rate for a sector-carrier, and a total amount of data transmitted from the BTS per sector-carrier in the wireless coverage area.

A percentile of the collected traffic data is selected. Next, a subset of the data samples is selected and used in a linear regression to identify an equation for the amount of data transmitted as a function of slot-utilization rate, and the equation is used to determine the maximum amount of data transmitted in the sector when the slot-utilization is at 100%. The ratio between the maximum amount of data transmitted and the percentile traffic value is calculated. When the ratio is below a certain value, an alert signal is generated. The alert signal may indicate (i) that a BTS should be upgraded with an additional sector-carrier, or (ii) that the BTS should be optimized by a maintenance team. Alternatively, the alert signal may enter an automated order for the installation of an additional sector-carrier.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
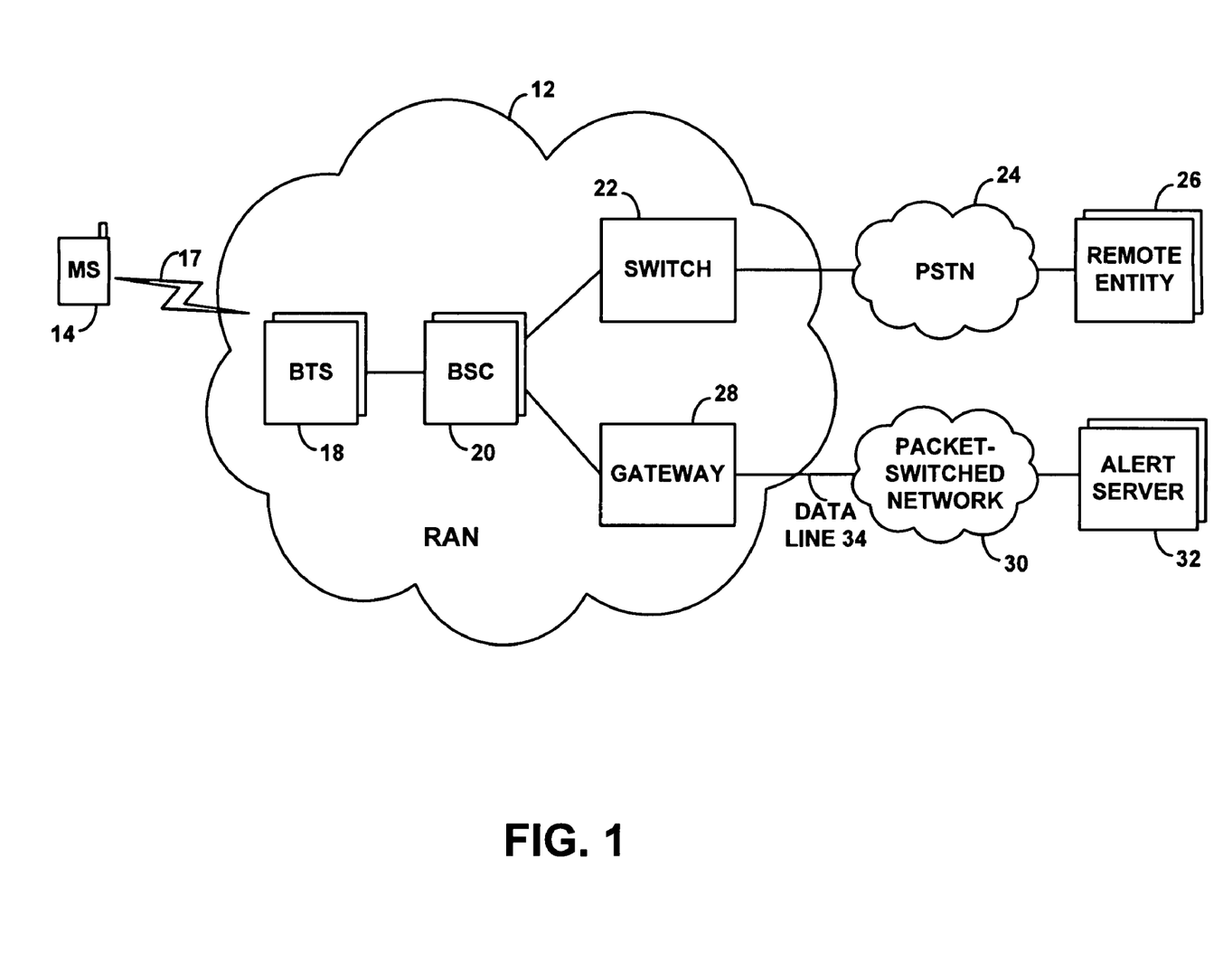
FIG. 1 is a simplified block diagram of a communication system in which an exemplary embodiment of the invention can be applied.

Referring to the drawings, FIG. 1 depicts a cellular communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine-language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts a representative mobile station 14, which could be a cell phone, wirelessly-equipped personal data assistant (PDA), or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), iDEN, WiMAX, TDMA, AMPS, GSM, GPRS, UMTS, EDGE, LTE, or any other communication protocol now known or later developed.

RAN 12 defines a plurality of sectors (i.e., any wireless coverage areas established by reference to base-station emissions or the like) in which mobile stations can communicate with the RAN. In particular, FIG. 1 shows the RAN radiating to define example sector 17. The RAN may define this sector discretely through use of directional antennas and/or by various modulation parameters, including, without limitation, carrier frequencies and PN offsets or other parameters, depending on the air-interface protocol used. Some or all of the sectors defined by the RAN may include one or more sector-carriers, each of which uses a different carrier frequency.

The RAN can take various forms and may include any of a variety and number of components, depending for instance on the air-interface protocol employed by the RAN. For example, the RAN may include one or more BTSs 18 and one or more BSCs 20 (also sometimes referred to as radio network controllers (RNCs)). The BTSs preferably include directional antennas, power amplifiers, and associated transceiver equipment arranged to establish the sectors shown, and to communicate with served mobile stations.

BTS 18 emits a pilot signal on each sector, typically at a power level higher than other downlink signals. And each mobile station 14 regularly measures the strength of each pilot signal that it receives and notifies BSC 20, for instance, when the signal strength of a given pilot signal falls above or below designated thresholds. BSC 20, in turn, provides mobile station 14 with an updated list of active pilots.

In addition, BTS 18 may allocate to a sector a plurality of uplink carrier frequencies, and a plurality of corresponding downlink carrier frequencies in order to provide the sector with a plurality of distinct sector-carriers. Each sector-carrier is associated with a particular cell or sector, and with a particular set of one or more carrier frequencies. For example, a sector-carrier may have a set of uplink channels that use a particular uplink carrier frequency and a set of downlink channels that use a particular downlink carrier frequency.

BTS 18 may transmit data to mobile-stations on each sector-carrier using a time-multiplexed protocol, such as 1xEV-DO. When BTS 18 is using a time-multiplexed protocol, data transmitted on the forward link of each sector-carrier is defined in terms of frames, which are then are divided into a number of time slots, which are generally 1.667 ms in length.

BSC 20 may control one or more BTSs and may manage aspects of air-interface operation. For instance, a BSC may manage assignment of air-interface traffic channels to mobile-stations in response to mobile-station origination messages. Further, the BSC may manage handoff of mobile-stations between sectors, by engaging in control channel signaling.

BSC 20 may also monitor and collect slot-utilization data for each sector-carrier on which BTS 18 transmits data, as well as the total data being transmitted to mobile stations by BTS 18 per sector-carrier (BTS-MS data). BSC 20 may then send this information to alert server 32.

Each BSC may be coupled with an MSC or other switch 22 that provides connectivity with the PSTN 24 if applicable, so that served mobile-stations can communicate with remote entities 26 on the PTSN. And each BSC may be coupled with a packet data serving node (PDSN) or other gateway 28 that provides connectivity with a packet-switched network 30, so that served mobile-stations (and other entities, such as BSC 20) can communicate with alert server 32 or other entities on the packet-switched network.

In addition, BSC 20 may collect information indicative of the forward and reverse throughput of data sent between RAN 12 and packet switched network 30 on data line 34 (throughput data). The throughput data may be the forward and reverse throughput at a specific instant in time, or may be the average forward and reverse throughput over a period of time. For example, the measured throughput data may be the average hourly forward and reverse throughput over a period of time. And other metrics are possible as well.

BSC 20 may also be arranged to determine the number of mobile-stations engaging in communication with entities on packet-switched network 30 (connection data). BSC 20 may also be arranged to send the collected throughput data and connection data to alert server 32.

Data line 34 connects RAN 12 to packet switched network 30. Data line 34 may comprise one or more data lines capable of transmitting packet data, such as a T1 line, or a fiber optic cable, for example.

Figure 2:
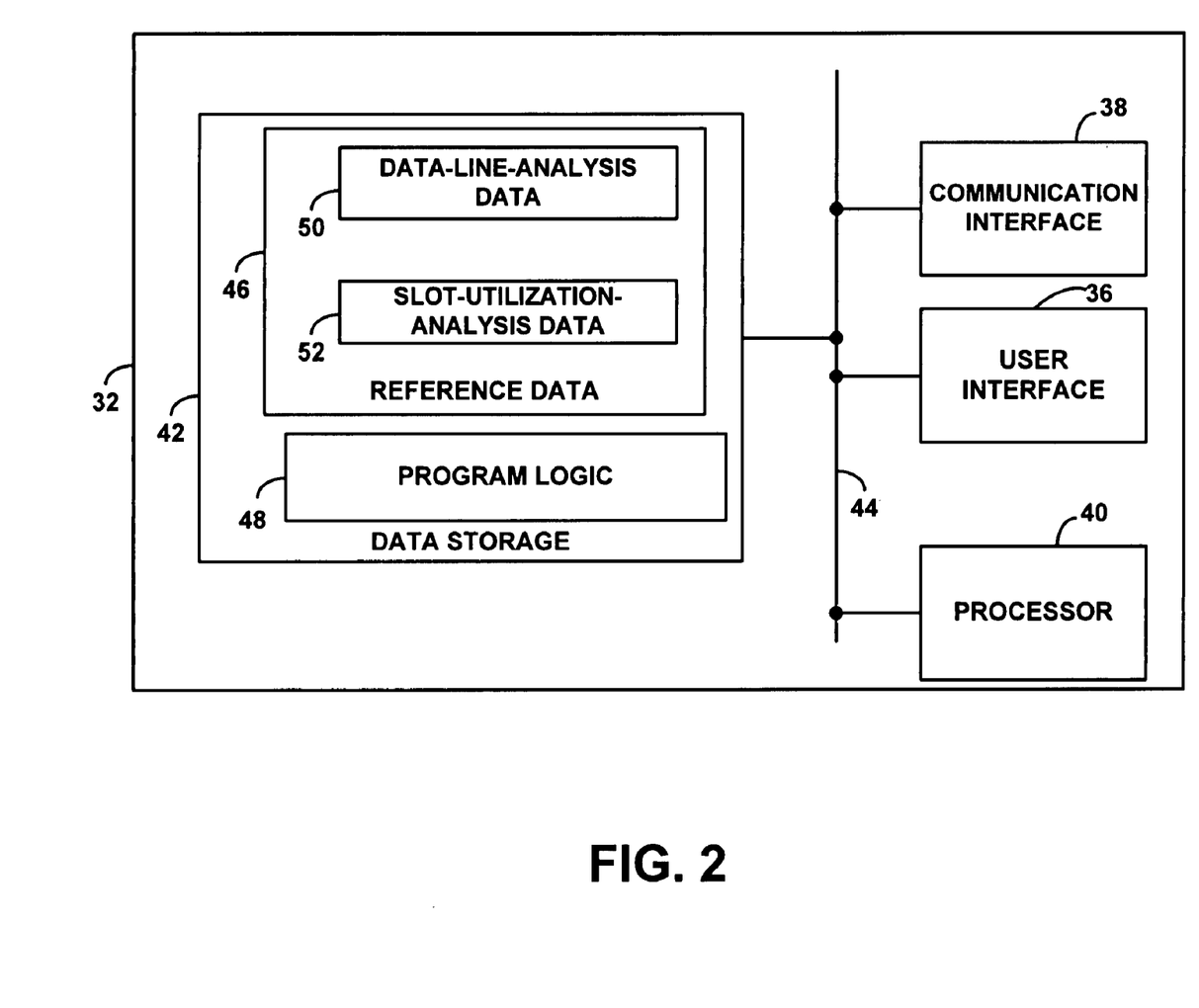
FIG. 2 is a simplified block diagram of an entity arranged to implement aspects of the exemplary embodiment.

FIG. 2 is a simplified block diagram depicting functional components of alert server 32. As shown, alert server 32 includes by way of example a user interface 36, a communication interface 38, a processor 40, and data storage 42, coupled together by a system bus, network, or other connection mechanism 44.

User interface 36 comprises input and output components to facilitate user interaction with the entity. The user interface 36 may include a keypad or other mechanism to facilitate tactile user input. Communication interface 38 may include one or more communication interface mechanisms that enable the entity to communicate with various other entities. As such, the communication interface may take various well known forms, depending on factors such as the type of communication links in use.

Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may be integrated in whole or in part with processor 40.

As shown, data storage 42 may hold reference data 46 and program logic 48. The reference data may comprise data-line-analysis data 50, and slot-utilization-analysis data 52. The program logic 48 may comprise machine-language instructions executable by processor 40 to carry out various functions described herein.

Alert server 32 may receive throughput data and connection data from BSC 20 and may store those values in data-line-analysis data 50. Alert server 32 may also receive information indicating the number of data lines 34 between packet-switched network 30 and RAN 12, and also store that information in data-line-analysis data 50. A network operator could input the number of data lines into alert server 32 using user interface 36. Alternatively, this information could be sent to alert server 32 by another entity on RAN 12 (such as BSC 20) or packet-switched network 30.

Additionally, alert server 32 may receive from BSC 20 the slot-utilization data and BTS-MS data and store those values into slot-utilization-analysis data 52.

As discussed in more detail below, the alert server 32 may be arranged, in accordance with the first embodiment, to analyze data-line-analysis data 50 and generate an alert signal if there are a minimum number of aberrations occurring over a period of time. The alert signal may indicate that an additional data line 34 should be installed.

As also discussed in more detail below, the alert server 32 may be arranged, in accordance with the second embodiment, to analyze slot-utilization-analysis data 52 to determine (i) whether BTS 18 should be upgraded with an additional sector-carrier or (ii) whether BTS 18 should be optimized by a maintenance team.

Figure 3:
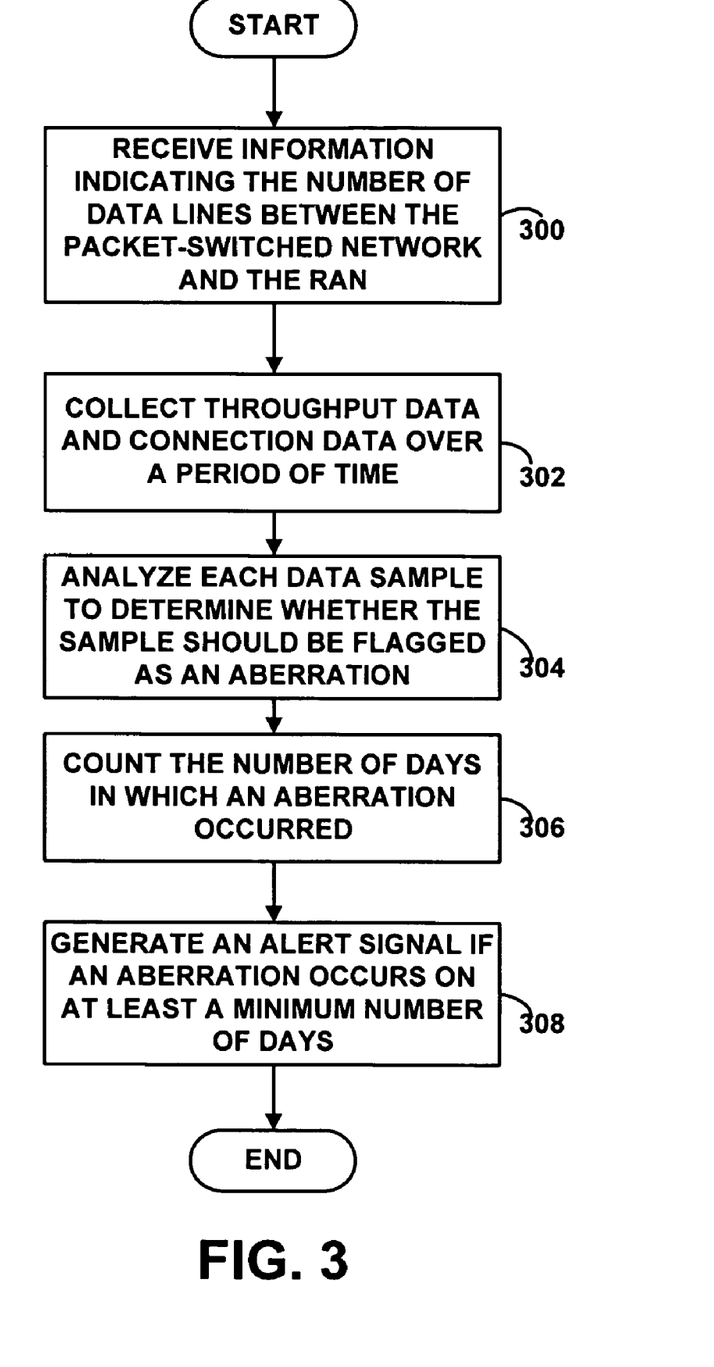
FIG. 3 is a flow chart depicting functions that can be carried out in accordance with the first embodiment.

FIG. 3 is a flow chart depicting in summary a set of functions that can be carried out in accordance with the first embodiment. Generally, FIG. 3 depicts a method of collecting the throughput data and the connection data over a period of time, analyzing the collected throughput data and the connection data, and generating an alert signal when another data line 34 should be installed.

As shown in FIG. 3, at step 300, alert server 32 receives information indicating the number of data lines 34 between packet-switched network 30 and RAN 12, and stores that information in data-line-analysis data 50. As noted above, alert server 32 may receive this input from a network operator inputting the information using user interface 36. Alternatively, alert server 32 could receive the information from another entity on packet-switched network 30 or RAN 12.

At step 302, alert server 32 collects throughput data and connection data over a period of time. For example, alert server 32 may collect from BSC 20 hourly forward and reverse throughput data and connection data for the previous thirty days (720 individual data samples), although other data-collection intervals and total periods of time may be used as well.

At step 304, alert server 32 analyzes each collected data sample of hourly throughput data and connection data, as well as the number of data lines between packet-switched network 30 and RAN 12, to determine whether the given data sample should be flagged as an aberration. Two criteria are needed to establish an aberration: the first criteria is met when the forward throughput or the reverse throughput of data line 34 exceeds 65% of the total forward or reverse throughput capacity of data line 34 (utilization-threshold). It should be understood that other utilization-threshold values may be used as well. For example, lower a utilization-threshold may be desirable for service providers that require more time to install additional data lines. Setting a lower threshold would provide an alert signal at an earlier point in time, and give the service provider additional time to install the data line without having to worry about the data line reaching 100% throughput.

The second criteria is met if the connection data (which, as stated, is the number of mobile-stations engaging in communication with entities on packet-switched network 30) in the collected data sample is greater than twice the number of data lines 34 between RAN 12 and packet-switched network 30 (connection-threshold). Other connection-threshold values (such as the average number of connections being three times the number of connections, for example) may also be used. Basing an aberration on connection-thresholds and utilization-thresholds is useful because it establishes (1) that data line 34 is approaching its maximum throughput, and (2) that the throughput of data line 34 is not being monopolized by a single user (who may be downloading a large movie, for example).

At step 306, alert server 32 counts the number of days on which an aberration occurred. For example, if there were 10 aberrations on day 1, 0 aberrations on day 2, 15 aberrations on day 3, and 30 aberrations on day 5, alert server 32 would count 3 separate days in which an aberration occurred.

At step 308 alert server 32 generates an alert signal if an aberration occurs on at least a minimum number of days. For example, alert server 32 may generate an alert signal if an aberration occurs at least 5 separate days. Requiring an aberration to occur on at least a minimum number of days establishes that the aberrations are most likely due to an overall increase in data traffic, and not due to an anomaly (such as a news event).

Figure 4:
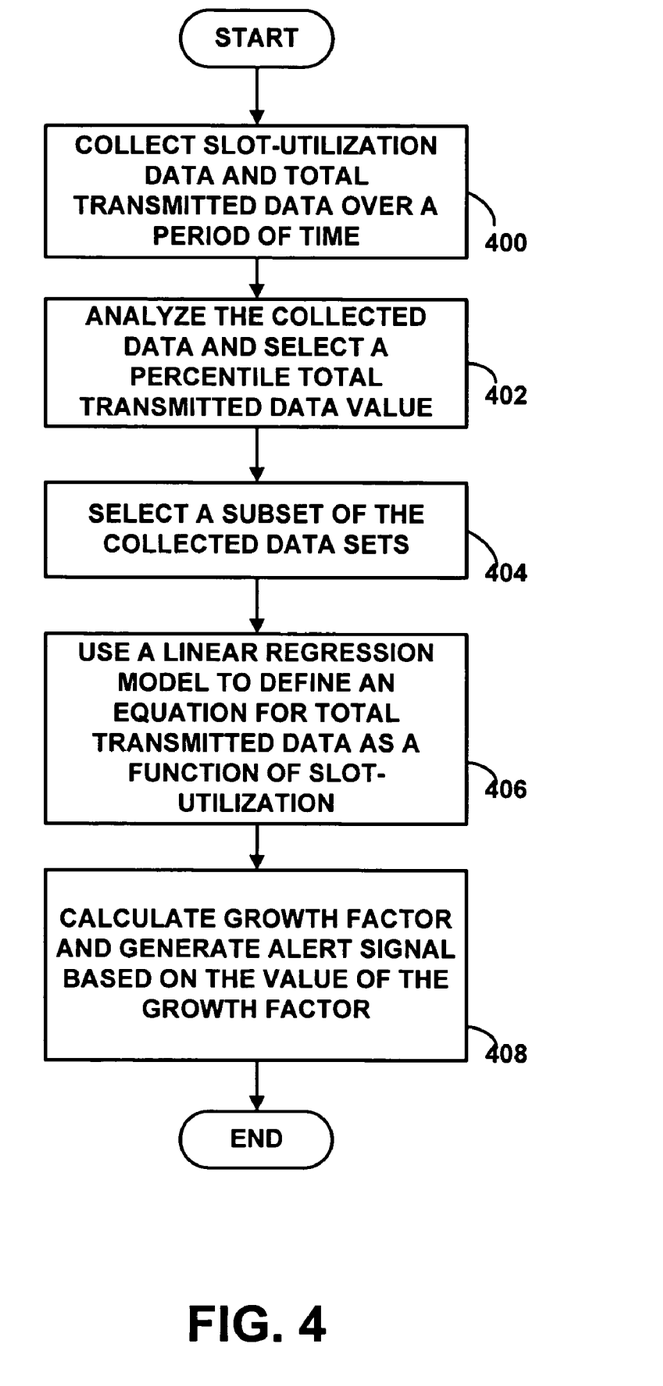
FIG. 4 is a flow chart depicting functions that can be carried out in accordance with the second embodiment.

The alert signal may take various forms. For example, alert server 32 may generate a report indicating that another data line 34 should be installed. Alternatively, the alert signal may enter an automated order for the installation of an additional data line to transmit data to the radio access network. And other possibilities exist as well FIG. 4 is a flow chart depicting in summary a set of functions that can be carried out in accordance with the second embodiment. Generally, FIG. 4 depicts a method for determining whether a BTS needs an additional sector-carrier, or whether the BTS needs to be optimized. To determine this, slot-utilization data and BTS-MS data is collected over a period of time. The data is analyzed to obtain two values, which are then compared to one another to determine whether an additional sector-carrier is needed or whether the sector-carrier should be optimized. The first value is obtained by selecting a percentile value of the traffic data values. The second value is obtained by using the BTS-MS data and the slot-utilization data in a linear regression in order to calculate an equation for the BTS-MS data as a function of slot-utilization. The equation is used to determine the amount of data that would be transmitted when the slot-utilization is 100% (maximum data transmitted).

As shown in FIG. 4, at step 400, alert server 32 collects slot-utilization data and BTS-MS data over a period of time. For example, alert server 32 may collect from BSC 20 sets of data that include hourly BTS-MS data and slot-utilization data for the previous thirty days (720 individual data sets), although other periods of time may be used as well.

At step 402, alert server 32 analyzes the collected data and selects the $90^{th}$ percentile BTS-MS data value. For example, if each of the 720 BTS-MS data values were arranged in order from the lowest amount of data sent from the BTS to the mobile-station to the highest, the $90^{th}$ percentile value would be the $648^{th}$ value. It should be understood that in this example alert server 32 selects a $90^{th}$ percentile value, but in practice other percentile values may be used depending on how far in advance the service provider would want an alert signal indicating when to add new sector carriers or to optimize the BTS. As discussed in more detail below at step 408, selecting a higher percentile value would result in the alert signal being generated earlier, and a lower percentile value would result in the alert signal being generated later.

Next, at step 404, alert server 32 selects a subset of the collected data sets to use in a linear regression. For example, the alert server 32 may select data samples in which the traffic data falls within a certain range. This is advantageous because it removes outliers, which leads to a more accurate regression equation.

At step 406, after selecting a subset of data samples, alert server 32 may use a linear regression model to calculate the BTS-MS data as a function of slot-utilization data (or vice versa). The calculated equation takes the following form:

$$TxData = \alpha * SU + \beta$$

where $\alpha$ and $\beta$ are constants, and SU is the slot-utilization data. The values of the constants are initially unknown, but may be calculated using any tool capable of linear regression.

Figure 5:
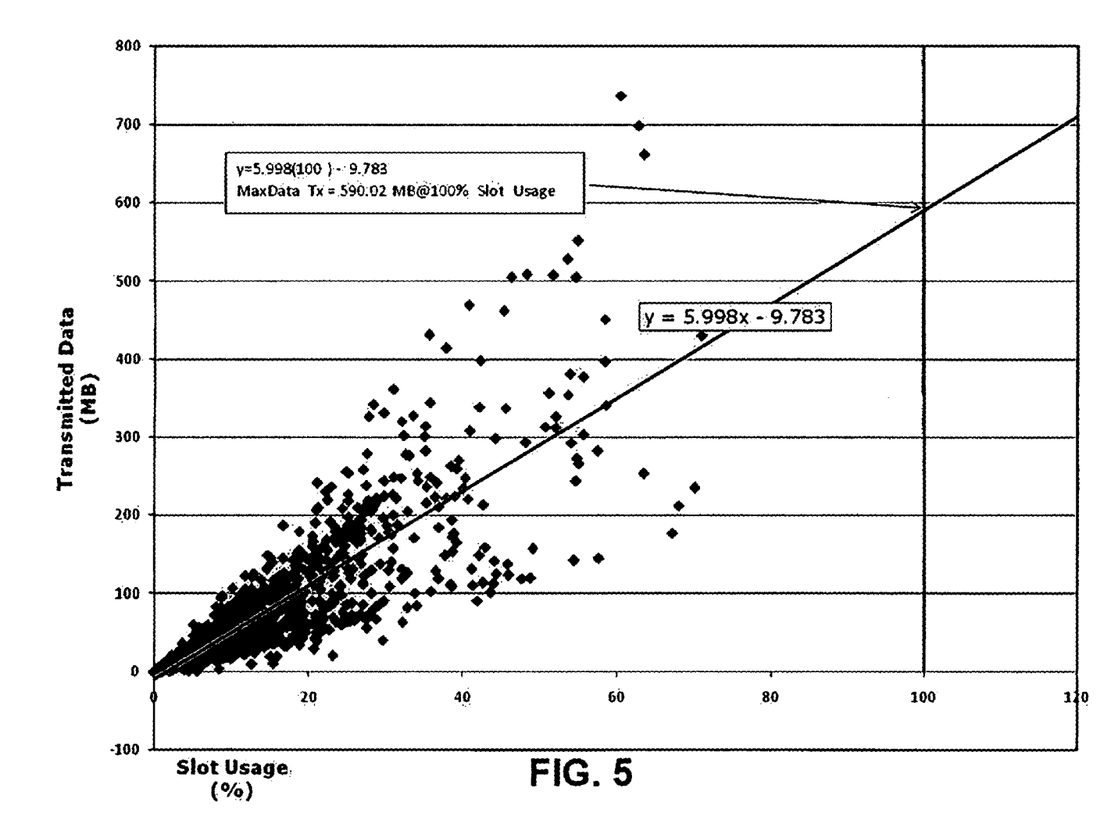
FIG. 5 is a two-dimensional plot depicting the amount of data transmitted in a sector-carrier as a function of slot-utilization, and a regression line.

After obtaining the equation for the BTS-MS data as a function of slot-utilization data, the equation may be used to determine the BTS-MS data when the slot-utilization is 100% (maximum data transmitted value). FIG. 5 is a two-dimensional plot depicting the subset of the received BTS-MS data versus the subset of the received slot-utilization data, and the calculated regression line. As can be seen in the example of FIG. 5, when the slot-utilization is 100%, the amount of data transmitted is 590.02.

After obtaining the equation, an $R^2$ value may be calculated. $R^2$ is a number between 0 and 1 that is indicative of how closely the regression equation explains the data set. An $R^2$ value of 1 indicates a perfect fit between the data and the regression. $R^2$ are well known and are not discussed in detail here.

At step 408, alert server 32 calculates a ratio between the maximum data transmitted value and the $90^{th}$ percentile BTS-MS data value. This ratio, called a growth factor, is then used to determine whether to generate an alert signal. For example, if the growth factor value is less than a threshold value (for example, 1.5), alert server 32 may generate an alert signal. The equation for the growth factor is as follows:

$$GF = \frac{MxData}{TxData(90)}$$

where MxData is maximum data transmitted value and TxData(90) is the $90^{th}$ percentile BTS-MS data value. It should be understood that the ratio may be inverted. However, in such a case, alert server 32 would generate the alert signal if the growth factor is above a threshold value.

The alert signal may indicate whether (1) a new sector-carrier is needed, or (2) optimization of the BTS is needed. To determine which alert signal to generate, alert server 32 compares the maximum data transmitted value to a pre-specified value. This value is indicative of what the service provider believes the maximum data transmitted by the BTS should be when the slot-utilization is 100%. If the maximum data transmitted value calculated in the linear regression is below that value, then it suggests that something may be wrong with the BTS, and that the BTS should be optimized by maintenance teams. The alert signal could be a report indicating that the BTS should be optimized. The alert signal could also automatically enter a service request for maintenance teams to optimize the sector. If the maximum data transmitted value is above that value, the alert signal could generate a report indicating that an additional sector-carrier should be installed. The alert signal could also place an automatic order for the installation of an additional sector carrier.

Alert server 32 may be prevented from generating an alert signal if the $R^2$ value of the linear regression is below a certain specified value. For example, if the $R^2$ value is below 0.7, indicating a poor fit between the data and the regression, alert server 32 would not send an alert signal.

Embodiments of the invention have been described above. Those of ordinary skill in the art will appreciate, however, that modifications may be made while remaining within the scope of the invention as defined by the claims.

We claim:

1. In a cellular network wherein at least one data line is used to transmit data to and from a radio access network, a method comprising:
   collecting sets of data over a period of time, wherein each set of data comprises (i) a forward throughput of the at least one data line, (ii) a reverse throughput of the at least one data line, and (iii) a number of connections using the at least one data line;
   for each collected set of data, analyzing the forward throughput and the number of connections using the at least one data line to detect an aberration;

for each collected set of data, analyzing the reverse throughput and the number of connections using the at least one data line to detect an aberration; and an alert server generating an alert signal based on a minimum number of aberrations over the period of time.

2. The method of claim 1, wherein generating the alert signal is further based on an amount of time between aberrations.

3. The method of claim 1, wherein analyzing the forward throughput to detect the aberration comprises comparing the forward throughput to a first threshold value.

4. The method of claim 3, comprising setting the first threshold value based on the number of data lines used to transmit data to and from the radio access network.

5. The method of claim 1, wherein analyzing the reverse throughput to detect the aberration comprises comparing the reverse throughput to a second threshold value.

6. The method of claim 5, comprising setting the second threshold value based on the number of data lines used to transmit data to and from the radio access network.

7. The method of claim 1, wherein generating the alert signal comprises entering an automated order for the installation of an additional data line to transmit data to and from the radio access network.

8. The method of claim 1, wherein generating the alert signal comprises generating a report indicating that an additional data line to transmit data to and from the radio access network should be installed.

9. A system comprising:
a communication interface;
a processing unit;
data storage; and
program logic stored in the data storage and executable by the processing unit to:
collect sets of data over a period of time, wherein each set of data comprises (i) a forward throughput of an at least one data line used to transmit data to and from a radio access network, (ii) a reverse throughput of the at least one data line, and (iii) a number of connections using the at least one data line;
for each collected set of data, analyze the forward throughput and the number of connections using the at least one data line to detect an aberration;
for each collected set of data, analyze the reverse throughput and the number of connections using the at least one data line to detect the aberration; and
generate an alert signal based on a minimum number of aberrations over the period of time.

10. The system of claim 9, wherein the program logic is further arranged to generate the alert signal based on an amount of time between aberrations.

11. The system of claim 9, wherein where the program logic is further arranged to detect the aberration by comparing the forward throughput to a first threshold value.

12. The system of claim 11, wherein the program logic is further arranged to set the first threshold value based on the number of data lines used to transmit data to and from the radio access network.

13. The system of claim 9, wherein where the program logic is further arranged to detect the aberration by comparing the reverse throughput to a second threshold value.

14. The system of claim 13, wherein the program logic is further arranged to set the second threshold value based on the number of data lines used to transmit data to and from the radio access network.

15. The system of claim 9, wherein the program logic arranged to generate an alert signal further comprises the program logic being arranged to enter an automated order for the installation of an additional data line to transmit data to and from the radio access network.

16. The system of claim 9, wherein the program logic arranged to generate an alert signal further comprises the program logic being arranged to generate a report indicating that an additional data line to transmit data to and from the radio access network should be installed.

17. In a cellular network wherein at least one data line is used to transmit data to and from a radio access network, a method comprising:
a base-station sending sets of data to an alert server over a period of time, wherein each set of data comprises (i) a forward throughput of the at least one data line, (ii) a reverse throughput of the at least one data line, and (iii) a number of connections using the at least one data line;
the alert server receiving the sets of data;
for each collected set of data, the alert server analyzing the forward throughput and the number of connections using the at least one data line to detect an aberration;
for each collected set of data, the alert server analyzing the reverse throughput and the number of connections using the at least one data line to detect an aberration; and
generating an alert signal based on a number of days in which an aberration occurs.

18. The method of claim 17, wherein generating an alert signal further comprises generating a report, the report indicating that an additional data line to transmit data to the radio access network should be installed.

19. The method of claim 17, wherein the alert server analyzing the number of connections using the at least one data line to detect an aberration comprises determining whether the number of connections using the at least one data line is greater than twice the number the at least one data lines used to transmit data to the radio access network.

20. The method of claim 17, wherein the alert server analyzing the forward throughput comprises determining whether the forward throughput exceeds a percentage of a total forward throughput capacity of the at least one data line.

* * * * *